US 8,882,206 B2

(12) United States Patent
Nakayama et al.

(10) Patent No.: US 8,882,206 B2
(45) Date of Patent: Nov. 11, 2014

(54) VEHICLE WHEEL DISK

(75) Inventors: Kazuhisa Nakayama, Toyokawa (JP);
Masafumi Bojo, Toyokawa (JP);
Takeshi Ogura, Toyokawa (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/466,556

(22) Filed: May 8, 2012

(65) Prior Publication Data

US 2012/0217792 A1 Aug. 30, 2012

Related U.S. Application Data

(63) Continuation of application No. PCT/JP2010/069890, filed on Nov. 9, 2010.

(30) Foreign Application Priority Data

Nov. 9, 2009 (JP) ................................. 2009-255982

(51) Int. Cl.
*B60B 3/10* (2006.01)
*B60B 3/00* (2006.01)
*B60B 3/04* (2006.01)

(52) U.S. Cl.
CPC . *B60B 3/10* (2013.01); *B60B 3/007* (2013.01); *B60B 3/044* (2013.01)
USPC ................................. 301/63.107; 301/64.101

(58) Field of Classification Search
CPC ........ B60B 3/002; B60B 3/004; B60B 3/005; B60B 3/007; B60B 3/04; B60B 3/10; B69B 3/12

USPC ........ 301/63.101, 63.103, 63.107, 64.101, 65
See application file for complete search history.

(56) References Cited

U.S. PATENT DOCUMENTS

| | | | |
|---|---|---|---|
| 5,899,537 A | 5/1999 | Abe | |
| 6,839,967 B2 * | 1/2005 | Abe et al. ................. | 29/894.325 |
| 8,042,880 B2 * | 10/2011 | Kozaki et al. ............ | 301/63.107 |
| 8,454,099 B2 * | 6/2013 | Sano et al. ............... | 301/63.103 |
| 8,646,726 B2 * | 2/2014 | Manzanares ................. | 244/99.2 |
| 2010/0289323 A1 * | 11/2010 | Sano et al. ............... | 301/63.103 |
| 2011/0316324 A1 * | 12/2011 | Kihara et al. .................... | 301/67 |

FOREIGN PATENT DOCUMENTS

| | | |
|---|---|---|
| JP | 09-095101 | 4/1997 |
| JP | 09-300901 | 11/1997 |
| JP | 2001-219701 | 8/2001 |
| JP | 2008-229679 A * | 3/2007 |

(Continued)

OTHER PUBLICATIONS

International Search Report issued in PCT/JP2010/069890 mailed Feb. 1, 2011.

(Continued)

*Primary Examiner* — Kip T Kotter
*Assistant Examiner* — Jean Charleston
(74) *Attorney, Agent, or Firm* — DLA Piper LLP (US)

(57) ABSTRACT

A vehicle wheel disk includes a hat portion having a crest portion extending continuously in a circumferential direction of the disk, an inner curved portion curved inwardly in an axial direction of the disk radially inside the crest portion and extending continuously in a circumferential direction of the disk, and an outer curved portion curved inwardly in the axial direction of the disk radially outside the crest portion and extending in the circumferential direction of the disk.

18 Claims, 15 Drawing Sheets

(56) References Cited

FOREIGN PATENT DOCUMENTS

| JP | 2007-191025 | | 8/2007 |
|---|---|---|---|
| JP | 2007-276784 | | 10/2007 |
| JP | 2008-114723 | | 5/2008 |
| JP | 2008-114723 A | * | 5/2008 |
| JP | 2009-113798 | | 5/2009 |

OTHER PUBLICATIONS

International Preliminary Report on Patentability issued in PCT/JP2010/069890 on Jun. 21, 2012.
Written Opinion issued in PCT/JP2010/069890 on Jun. 21, 2012.
English Languabe Abstract of JP 2009-113798 published on May 28, 2009.
English Languabe Translation of JP 2009-113798 published on May 28, 2009.
English Language Abstract of JP 2008-114723 published on May 22, 2008.
English Language Translation of JP 2008-114723 published on May 22, 2008.
English Language Abstract of JP 2007-191025 published on Aug. 2, 2007.
English Language Translation of JP 2007-191025 published on Aug. 2, 2007.
English Language Abstract of JP 09-095101 published on Apr. 8, 1997.
English Language Translation of JP 09-095101 published on Apr. 8, 1997.
English Language Abstract of JP 2007-276784 published on Oct. 25, 2007.
English Language Translation of JP 2007-276784 published on Oct. 25, 2007.
English Language Abstract of JP 09-300901 published Nov. 25, 1997.
English Language Translation of JP 09-300901 published Nov. 25, 1997.
English Language Abstract of JP 2001-219701 published Aug. 14, 2001.
English Language Translation of JP 2001-219701 published Aug. 14, 2001.

* cited by examiner

VEHICLE WHEEL DISK

CROSS REFERENCE TO RELATED APPLICATIONS

This is a continuation of International Application Serial No. PCT/JP2010/069890, filed on Nov. 9, 2010, which claims priority from Japanese Patent Application No. Japanese 2009-255982, filed on Nov. 9, 2009, the disclosures of which are hereby incorporated by reference in their entirety.

TECHNICAL FIELD

The present invention relates to a wheel disk for a vehicle.

DETAILED DESCRIPTION OF THE PREFERRED EMBODIMENTS OF THE PRESENT INVENTION

Figure 3:
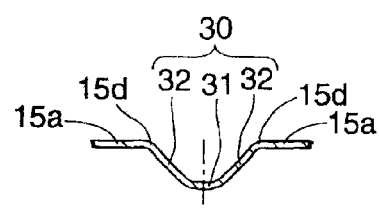
FIG. 3 is a cross-sectional view taken along line A-A of FIG. 1.
Figure 4:
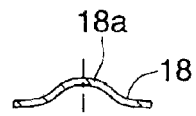
FIG. 4 is a cross-sectional view taken along line B-B of FIG. 1.
Figure 5:
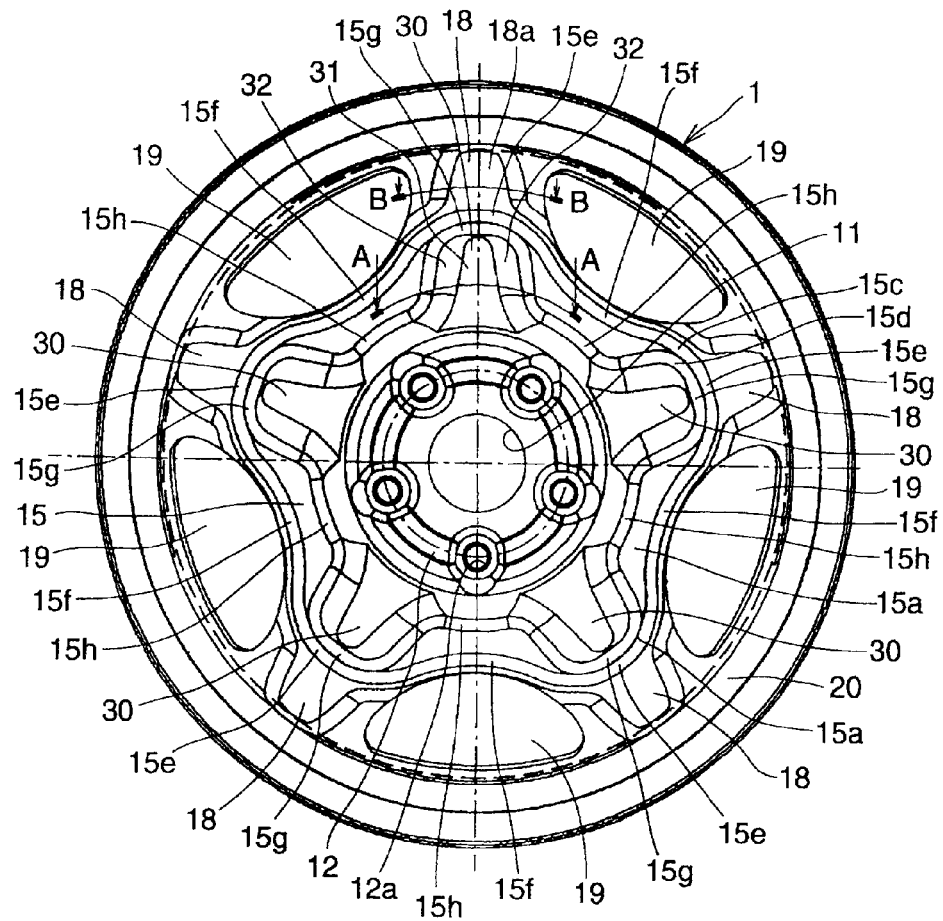
FIG. 5 is a front view of a wheel having a vehicle wheel disk according to a second embodiment of the present invention.
Figure 6:
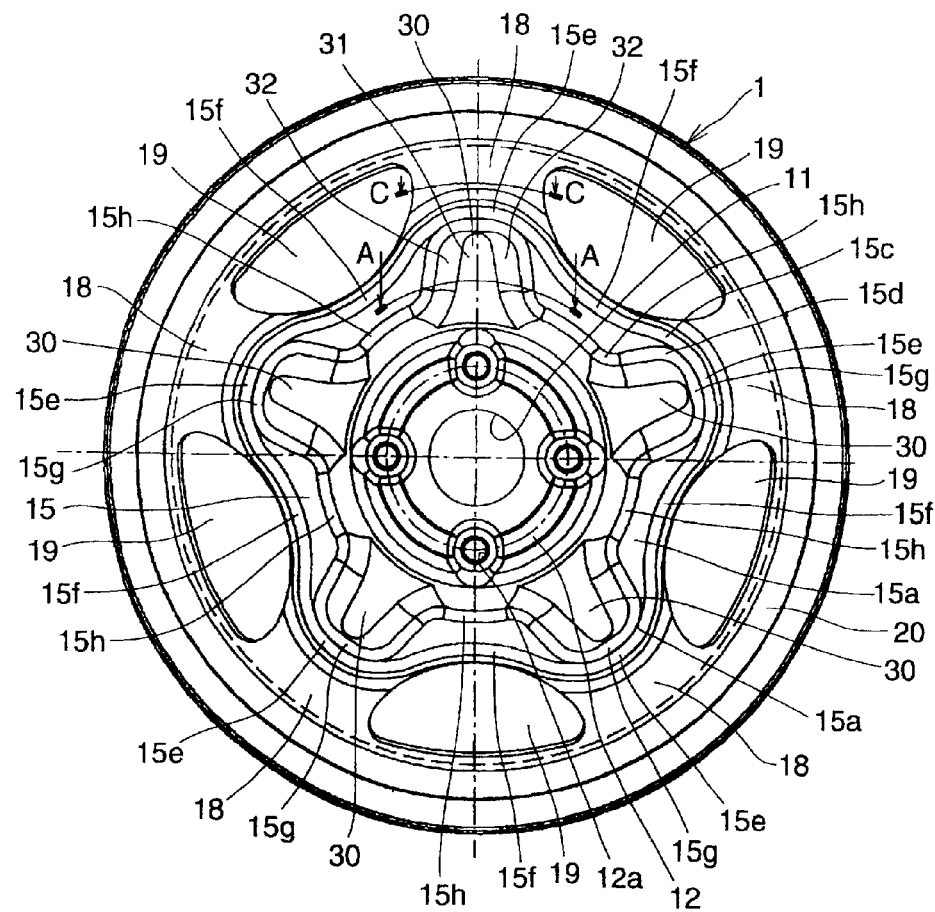
FIG. 6 is a front view of a wheel having a vehicle wheel disk according to a third embodiment of the present invention.
Figure 7:
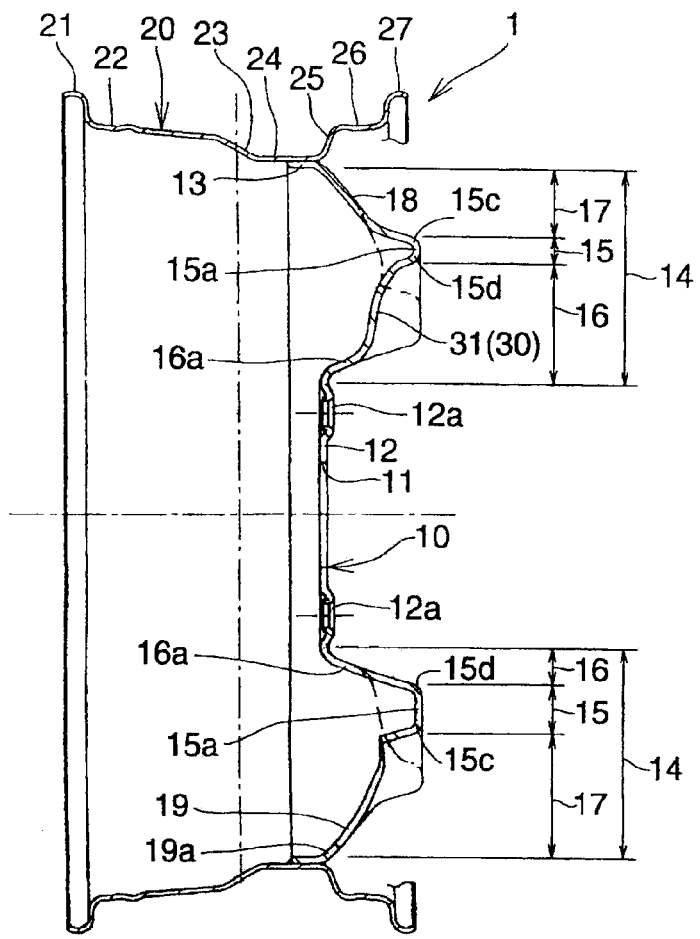
FIG. 7 is a cross-sectional view of the wheel having the vehicle wheel disk according to the third embodiment of the present invention.
Figure 8:
FIG. 8 is a cross-sectional view taken along line C-C of FIG. 6.
Figure 9:
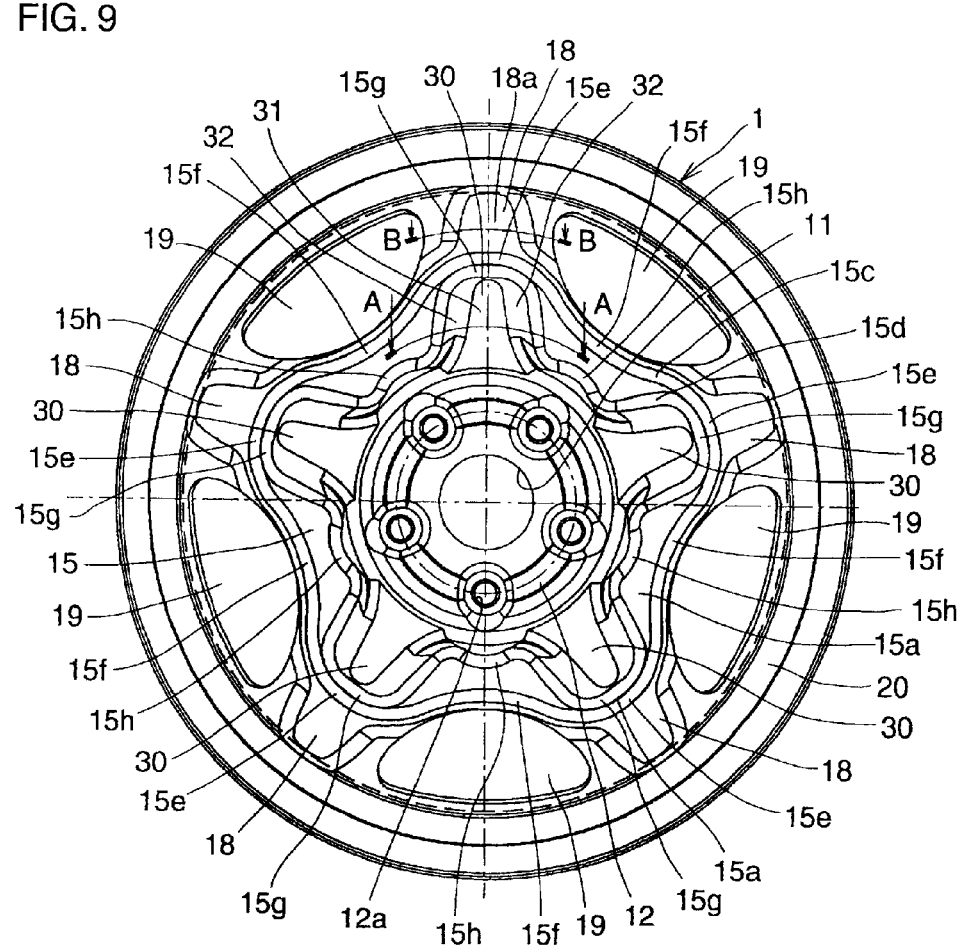
FIG. 9 is a front view of a wheel having a vehicle wheel disk according to a fourth embodiment of the present invention.
Figure 10:
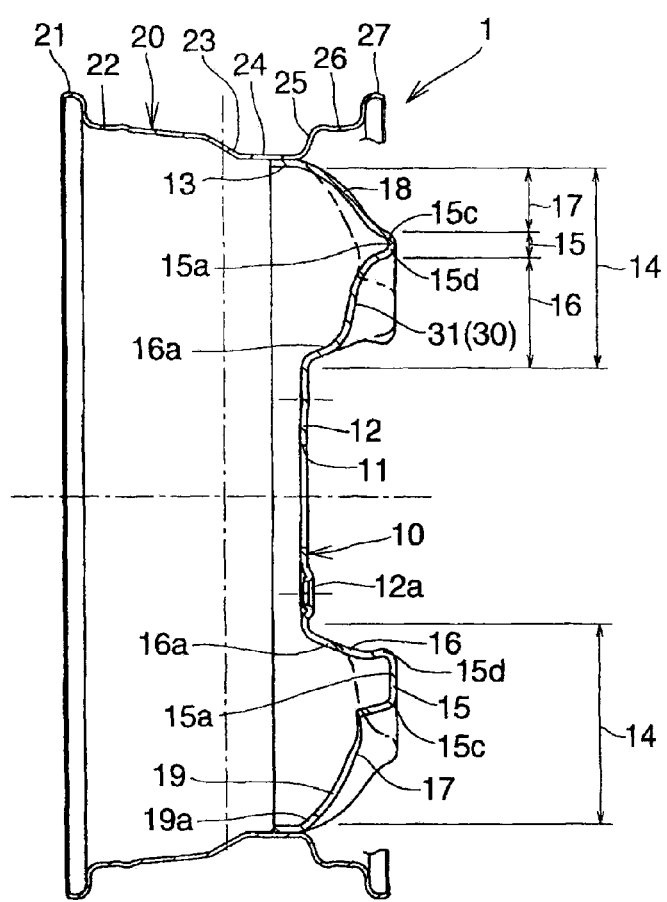
FIG. 10 is a front view of a wheel having a vehicle wheel disk according to a fifth embodiment of the present invention.
Figure 11:
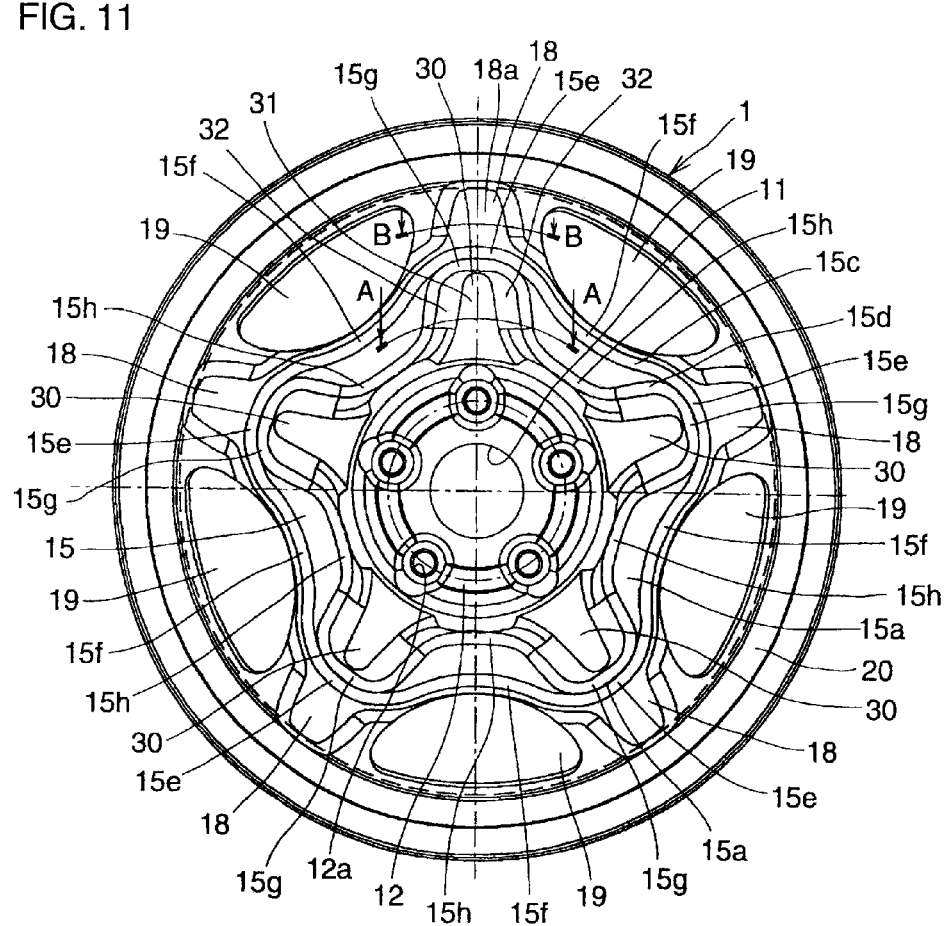
FIG. 11 is a front view of a wheel having a vehicle wheel disk according to a sixth embodiment of the present invention.
Figure 12:
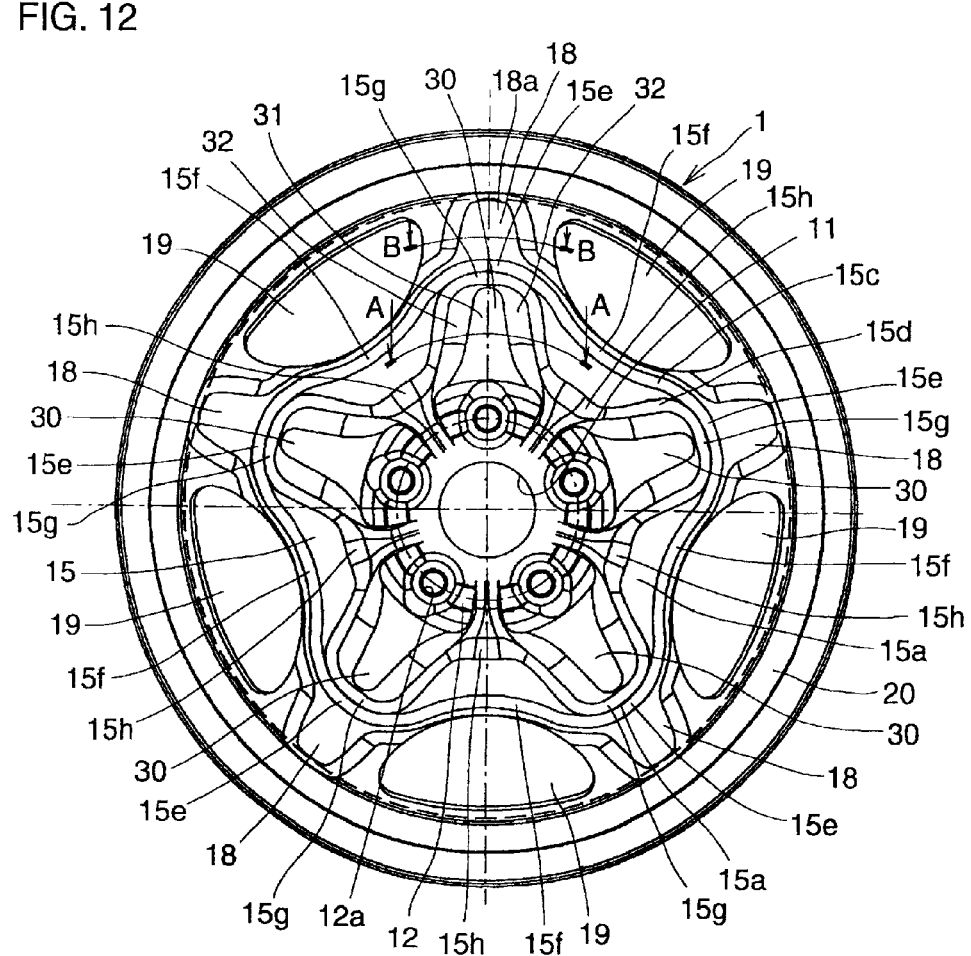
FIG. 12 is a front view of a wheel having a vehicle wheel disk according to a seventh embodiment of the present invention.
Figure 13:
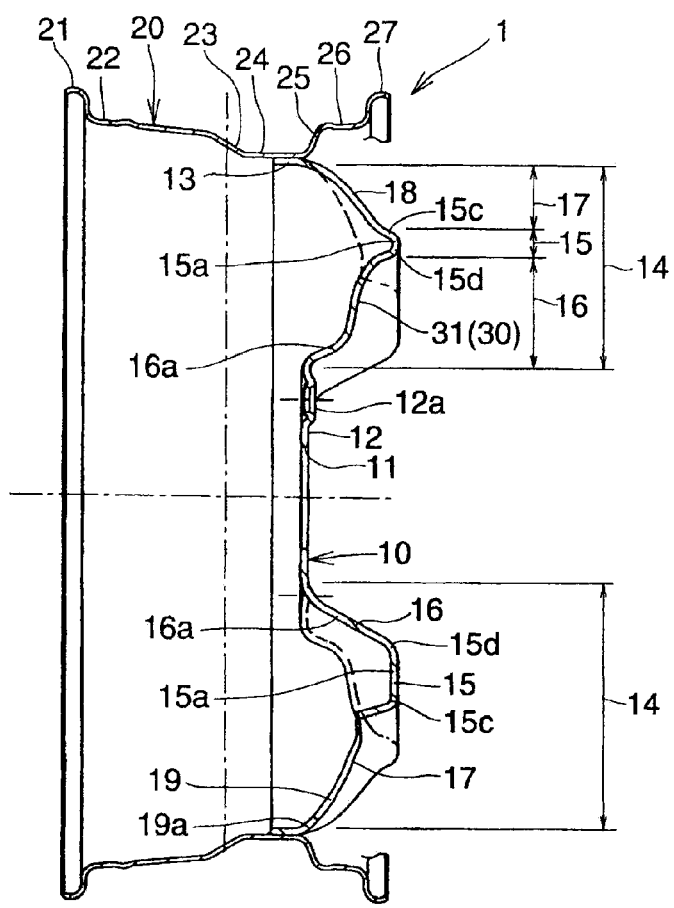
FIG. 13 is a cross-sectional view of the wheel having the vehicle wheel disk according to the first embodiment of the present invention.
Figure 14:
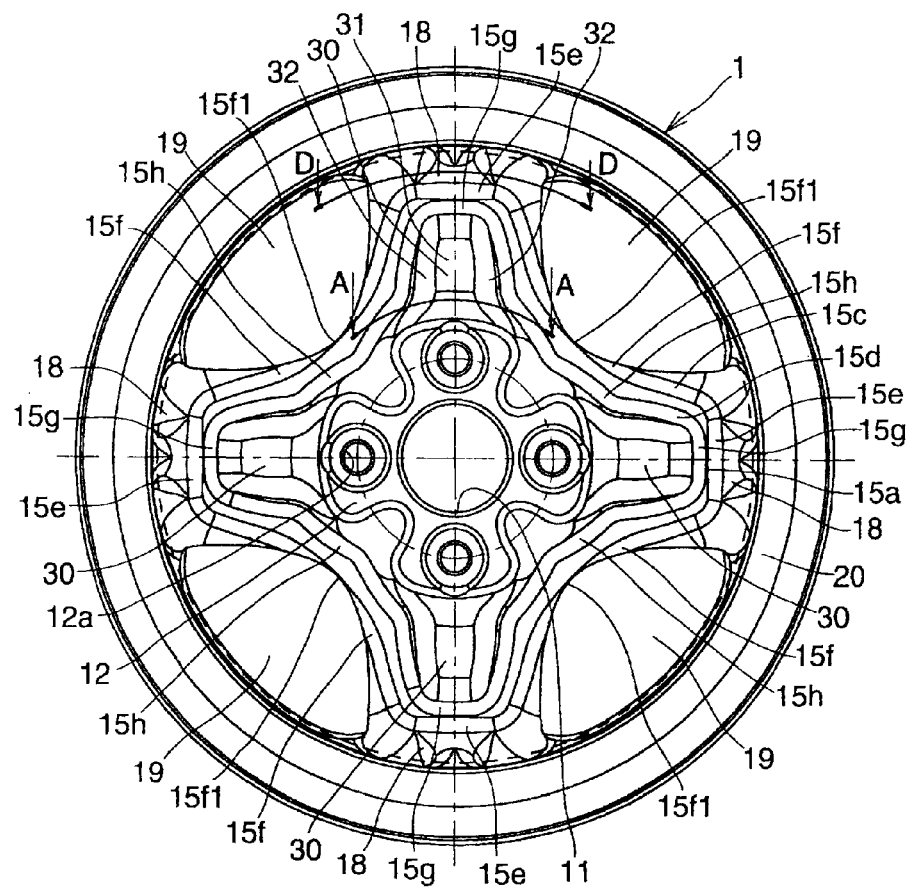
FIG. 14 is a front view of a wheel having a vehicle wheel disk according to an eighth embodiment of the present invention.
Figure 15:
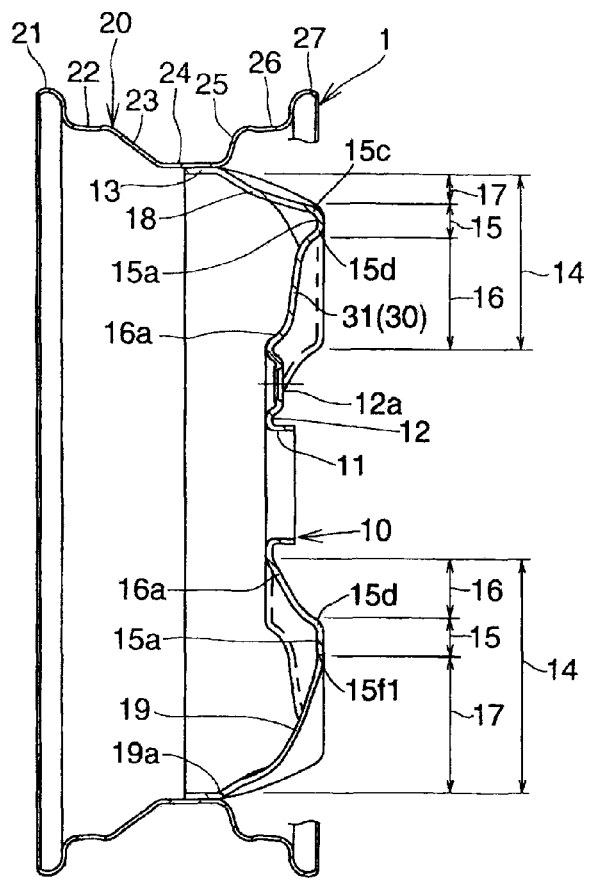
FIG. 15 is a cross-sectional view of the wheel having the vehicle wheel disk according to the eighth embodiment of the present invention.
Figure 16:
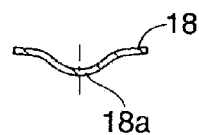
FIG. 16 is a cross-sectional view taken along line D-D of FIG. 16.

FIGS. 1-4 illustrate a wheel having a vehicle wheel disk according to a first embodiment of the present invention. FIG. 5 illustrates a wheel having a vehicle wheel disk according to a second embodiment of the present invention. FIGS. 6-8 illustrate a wheel having a vehicle wheel disk according to a third embodiment of the present invention. FIG. 9 illustrates a wheel having a vehicle wheel disk according to a fourth embodiment of the present invention. FIG. 10 illustrates a wheel having a vehicle wheel disk according to a fifth embodiment of the present invention. FIG. 11 illustrates a wheel having a vehicle wheel disk according to a sixth embodiment of the present invention. FIGS. 12 and 13 illustrate a wheel having a vehicle wheel disk according to a seventh embodiment of the present invention. FIGS. 14-16 illustrate a wheel having a vehicle wheel disk according to an eighth embodiment of the present invention. FIGS. 17-24 illustrate alterations applicable to all embodiments of the present invention.

FIG. 3 is applicable to not only the first embodiment of the present invention but also the second to eighth embodiments of the present invention. FIG. 4 is applicable to not only the first embodiment of the present invention but also the second and the fourth to seventh embodiments of the present invention.

Portions common over all embodiments of the present invention are denoted with the same reference numerals over all embodiments of the present invention.

First, portions common over all embodiments of the present invention will be explained.

Figure 2:
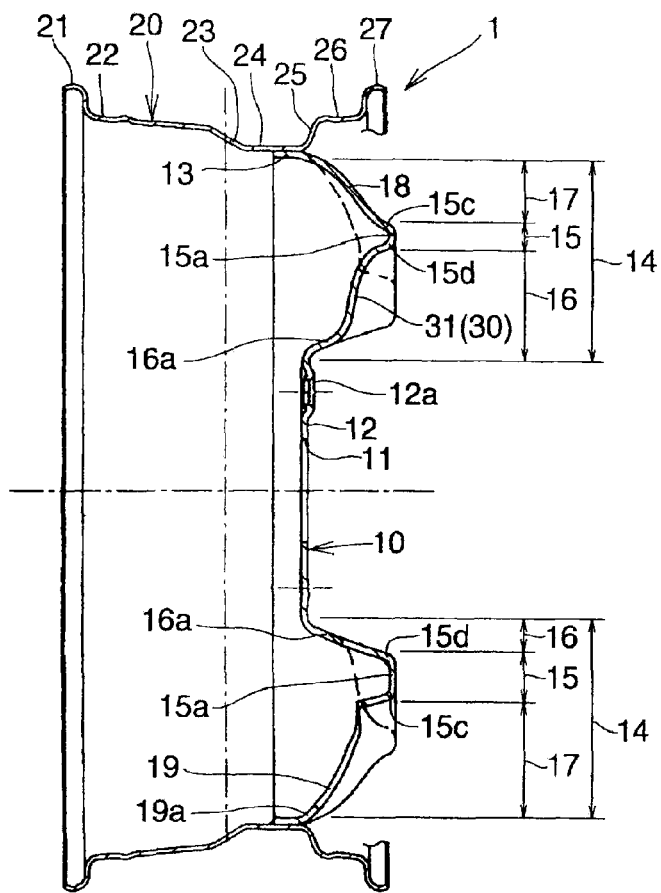
FIG. 2 is a cross-sectional view of the wheel having the vehicle wheel disk according to the first embodiment of the present invention.

A vehicle wheel disk (hereinafter, a wheel disk or a disk) 10 according to the embodiments of the present invention is used for a passenger car. The disk 10 may be fabricated from a plate material. Alternatively, the disk may be a cast disk. The disk 10 may be made from steel. Alternatively, the disk 10 may be made from aluminum alloy, titanium alloy, magnesium alloy, or synthetic resin, etc. As illustrated in FIG. 2, the disk 10 may be manufactured independently of an annular rim (a portion of a wheel holding a tire (not shown)) 20 and may be coupled with the rim 20 by welding, a rivet, or an adhesive to construct a wheel 1.

The rim 20 may be fabricated from a plate material. The rim 20 includes an inboard flange portion 21, an inboard bead seat portion 22, an inboard side wall portion 23, a drop portion 24, an outboard side wall portion 25, an outboard bead seat portion 26 and an outboard flange portion 27. The inboard flange portion 21, the inboard bead seat portion 22 and the inboard side wall portion 23 are portions located nearer to a central portion of a vehicle (a central portion in a width direction of the vehicle) in an axial direction of the disk (i.e., a width direction of the wheel) than the outboard side wall portion 25, the outboard bead seat portion 26 and the outboard flange portion 27, when the wheel 1 is mounted to the vehicle.

The disk 10 may include a hub hole 11, a hub coupling portion 12, a disk flange portion 13, an intermediate portion 14, and a concave portion 30. The intermediate portion 14 may include a hat portion 15, an intermediate inner portion (i.e., a radially inner portion of the intermediate portion) 16 and an intermediate outer portion (i.e., a radially outer portion of the intermediate portion) 17. The intermediate outer portion 17 may have a vent window 19 formed therein.

Figure 1:
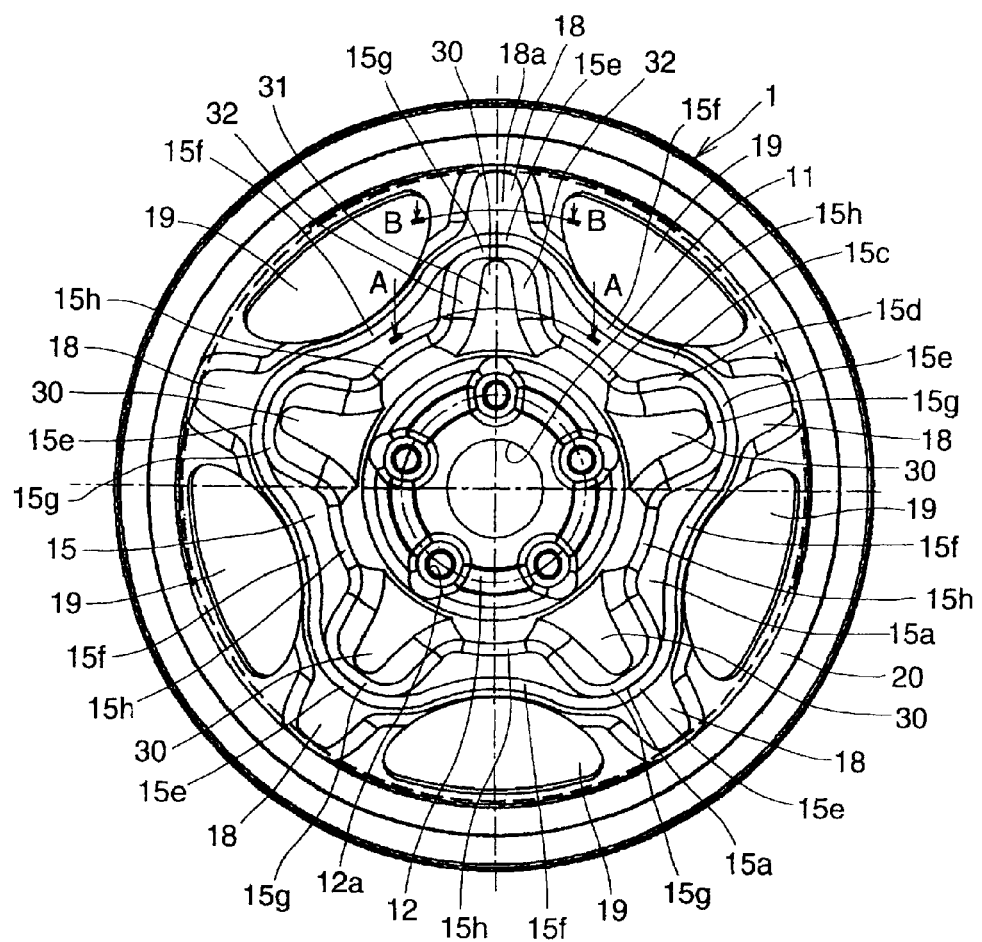
FIG. 1 is a front view of a wheel having a vehicle wheel disk according to a first embodiment of the present invention.

As illustrated in FIG. 1, the hub hole 11 may be located at a central portion of the disk 10 in a radial direction of the disk.

The hub coupling portion 12 may surround the hub hole 11. The hub coupling portion 12 may be like a flat plate or a substantially flat plate and may be located in a plane perpendicular or substantially perpendicular to an axial direction of the disk. A plurality of hub bolt holes 12a may be provided at the hub coupling portion 12. The hub bolt holes 12a may be provided on a circle having a constant radius and at an equal interval in a circumferential direction of the disk. For example, five hub bolt holes 12a may be provided. However, the number of the hub bolt holes 12a is not limited to five, and may be three, four, or six or more. The disk 10 (or the wheel 1) may be fixed to a hub (not shown) of the vehicle by causing a hub bolt (not shown) extending from the hub of the vehicle to extend through the hub hole and coupling a hub nut (not shown) to the hub bolt. Alternatively, the disk 10 (or the wheel 1) may be fixed to the hub by coupling the hub bolt to a tap hole provided at the hub.

As illustrated in FIG. 2, the disk flange portion 13 may be located at a radially outer end portion of the disk 10. The disk flange portion 13 may be like a ring continuous in the circumferential direction of the disk. Alternatively, the disk flange portion 13 may be like a ring discontinuous partially in the circumferential direction of the disk. The disk flange portion 13 may extend straight in the axial direction of the disk in a cross section taken along a radially extending plane (i.e., in a cross section taken along a plane perpendicular to the circumferential direction of the disk).

In FIG. 2, the disk flange portion 13 may be fit into the drop portion 24 of the rim 20 and coupled (fixed, welded) to the drop portion 24. Alternatively, the disk flange portion 13 may be fit into and coupled to a rim portion other than the drop portion 24, e.g., the inboard bead seat portion 22 or the outboard bead seat portion 26 of the rim 20. Further, the rim 20 and the disk flange 13 may be butt-coupled to each other without fitting.

The intermediate portion 14 connects the hub coupling portion 12 and the disk flange portion 13 in the radial direction of the disk.

As illustrated in FIG. 2, the hat portion 15 may protrude outwardly in the axial direction of the disk. As illustrated in FIG. 2, the hat portion 15 may include a crest portion 15a extending continuously in the circumferential direction of the disk, and an inner curved portion 15d curved inwardly in the axial direction of the disk radially inside the crest portion 15a and extending continuously in the circumferential direction of the disk. The hat portion 15 may include an outer curved portion 15c curved inwardly in the axial direction of the disk radially outside the crest portion 15a and extending continuously or discontinuously in the circumferential direction of the disk. The hat portion 15 includes the outer curved portion 15c at a disk portion where the outer curved portion 15c extends continuously in the circumferential direction of the disk.

The crest portion 15a is a portion connecting the outer curved portion 15c and the inner curved portion 15d radially between the outer curved portion 15c and the inner curved portion 15d.

Figure 19:
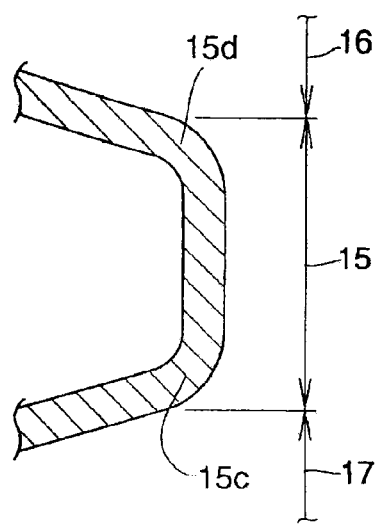
FIG. 19 is an enlarged cross-sectional view of a crest portion and a vicinity thereof, of a vehicle wheel disk according to an embodiment of the present invention, where the crest portion extends straight in a direction perpendicular to an axial direction of the disk in a radial cross section of the disk.
Figure 20:
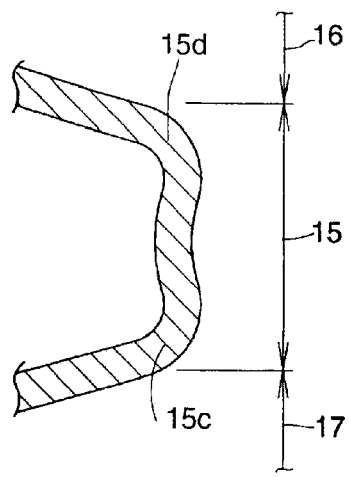
FIG. 20 is an enlarged cross-sectional view of a crest portion and a vicinity thereof, of a vehicle wheel disk according to an embodiment of the present invention, where the crest portion is curved inwardly in an axial direction of the disk in a radial cross section of the disk.
Figure 21:
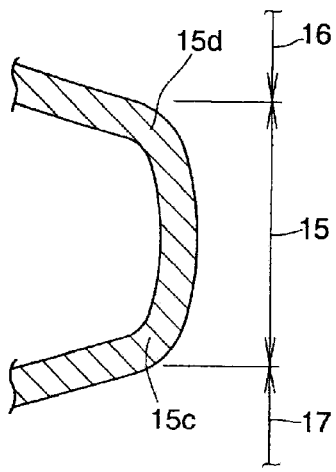
FIG. 21 is an enlarged cross-sectional view of a crest portion and a vicinity thereof, of a vehicle wheel disk according to an embodiment of the present invention, where the crest portion is curved outwardly in an axial direction of the disk in a radial cross section of the disk.
Figure 22:
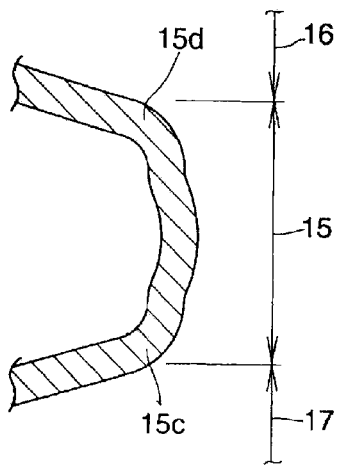
FIG. 22 is an enlarged cross-sectional view of a crest portion and a vicinity thereof, of a vehicle wheel disk according to an embodiment of the present invention, where the crest portion has both a portion curved inwardly in an axial direction of the disk and a portion curved outwardly in an axial direction of the disk in a radial cross section of the disk.

In a cross section taken along a radially extending plane, the crest portion 15a may extend straight as illustrated in FIG. 19, may be curved inwardly in the axial direction of the disk as illustrated in FIG. 20, may be curved outwardly in the axial direction of the disk as illustrated in FIG. 21, or may have both a portion curved inwardly in the axial direction of the disk and a portion curved outwardly in the axial direction of the disk as illustrated in FIG. 22.

Figure 23:
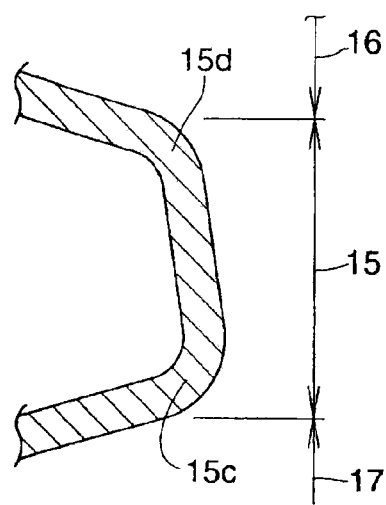
FIG. 23 is an enlarged cross-sectional view of a crest portion and a vicinity thereof, of a vehicle wheel disk according to an embodiment of the present invention, where the crest portion is inclined outwardly in a radial direction of the disk and outwardly in an axial direction of the disk in a radial cross section of the disk.
Figure 24:
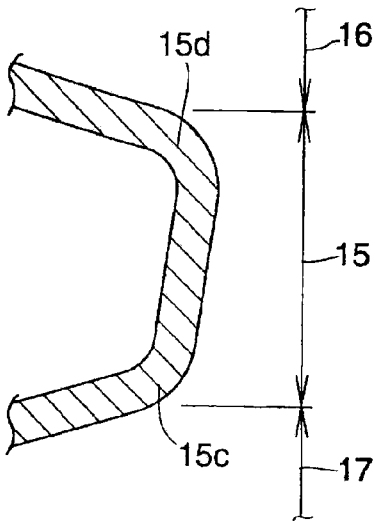
FIG. 24 is an enlarged cross-sectional view of a crest portion and a vicinity thereof, of a vehicle wheel disk according to an embodiment of the present invention, where the crest portion is inclined outwardly in a radial direction of the disk and inwardly in an axial direction of the disk in a radial cross section of the disk.

In a cross section taken along a radially extending plane, the crest portion 15a may extend straight in a direction perpendicular to the axial direction of the disk as illustrated in FIG. 19, may be inclined axially inwardly in the radially outward direction of the disk as illustrated in FIG. 23, or may be inclined axially outwardly in the radially outward direction of the disk as illustrated in FIG. 24.

As illustrated in FIG. 1, the crest portion 15a may have a larger radial width at a portion radially inside the vent window 19 in the circumferential direction of the disk (i.e., between a second portion 15f of the outer curved portion and a second portion 15h of the inner curved portion as described later) than at a portion between adjacent vent windows 19 in the circumferential direction of the disk (i.e., between a first portion 15e of the outer curved portion and a first portion 15g of the inner curved portion as described later). Alternatively, the crest portion 15a may have a smaller radial width at a portion radially inside the vent window 19 in the circumferential direction of the disk than at a portion between adjacent vent windows 19 in the circumferential direction of the disk.

As illustrated in FIG. 2, in a cross section taken along any radially extending plane, the crest portion 15a may include a portion located most outwardly in the axial direction of the disk among the hat portion 15 (or the disk 10). A position of the crest portion 15a in the axial direction of the disk may be constant or may vary in the circumferential direction of the disk. When the position of the crest portion 15a in the axial direction of the disk varies in the circumferential direction of the disk, it is preferable that portions of the crest portion 15a located at different axial positions may be smoothly connected to each other in the circumferential direction of the disk.

As illustrated in FIG. 1, the outer curved portion 15c may include a first portion 15e and a second portion 15f offset from the first portion 15e of the outer curved portion in the circumferential direction of the disk and located radially inwardly compared to the first portion 15e of the outer curved portion. The outer curved portion 15c may include the first portion 15e and the second portion 15f alternately in the circumferential direction of the disk. The first portion 15e of the outer curved portion may be a portion convex (outwardly) in the radial direction of the disk, and the second portion 15f of the outer curved portion may be a portion concave in the radial direction of the disk. The first portion 15e and the second portion 15f is smoothly connected to each other at the connecting point.

A central portion in the circumferential direction of the first portion 15e of the outer curved portion is located between adjacent vent windows 19 in the circumferential direction of the disk. A central portion in the circumferential direction of the second portion 15f of the outer curved portion is located radially inside the vent windows 19. When viewed in the axial direction of the disk, the second portion 15f of the outer curved portion is generally concave inwardly in the radial direction of the disk like a shape of a radially inner portion of the vent window 19.

At least a portion (at least a circumferentially central portion) of the first portion 15e of the outer curved portion is located radially outward from a circle (line) connecting radially innermost portions of a plurality of vent windows 19.

The first portion 15e of the outer curved portion may be located radially inward from the disk flange portion 13. The first portion 15e of the outer curved portion may be located radially inward from a circle (line) connecting radially outermost portions of vent windows 19. Alternatively, the first portion 15e of the outer curved portion may be located at the same radial position as the circle (line) connecting radially outermost portions of vent windows 19 or may be located radially outward from a circle (line) connecting radially outermost portions of vent windows 19.

The inner curved portion 15d may include a first portion 15g and a second portion 15h offset from the first portion 15g of the inner curved portion in the circumferential direction of the disk and located radially inwardly compared to the first portion 15g of the inner curved portion in the radial direction of the disk. The inner curved portion 15d may include the first portion 15g and the second portion 15h alternately in the circumferential direction of the disk.

The first portion 15g of the inner curved portion may be a portion located radially inwardly compared to the first portion 15e of the outer curved portion and may be a portion convex (outwardly) in the radial direction of the disk. The second portion 15h of the inner curved portion may be a portion located radially inwardly compared to the second portion 15f of the outer curved portion and a portion connecting adjacent first portions 15g of the inner curved portion in the circumferential direction of the disk. The first portion 15g of the inner curved portion and the second portion 15h of the inner curved portion may be smoothly connected to each other or may not be smoothly connected to each other.

As illustrated in FIG. 1, a circumferentially central portion and a vicinity thereof of the second portion 15h of the inner curved portion may have the shape of an arc having its center at a radial center of the disk when viewed in the axial direction of the disk. Alternatively, as illustrated in FIG. 11, an entire portion of the second portion 15h of the inner curved portion may be concave inwardly in the radial direction of the disk like the shape of the radially inner portion of the vent window 19 when viewed in the axial direction of the disk.

As illustrated in FIG. 9, a part of the circumferentially central portion and the vicinity thereof of the second portion 15h of the inner curved portion may be convex outwardly in the radial direction of the disk at a larger curvature (at a smaller radius of curvature) than a curvature of the arc (in the embodiment of FIG. 1) having its center at the radial center of the disk. In the case of this shape, even if the second portion 15h of the inner curved portion and the hub bolt hole 12a coincide with each other in position in the circumferential direction of the disk, the second portion 15h of the inner curved portion will be prevented from interfering with a hub nut (not shown), when the hub nut is coupled to a hub bolt (not shown) extending through the hub bolt hole 12a.

As illustrated in FIG. 14, the second portion 15h of the inner curved portion may be formed in the shape of alphabet letter "V" (including a substantial "V") when viewed in the axial direction of the disk, where a circumferentially central portion of the second portion 15h is located radially inner than circumferentially opposite ends of the second portion 15h.

In the embodiment of FIG. 2, the inner curved portion 15d may not protrude inwardly (toward the intermediate inner portion 16) in the radial direction of the disk over the entire portion of the inner curved portion 15d in the circumferential direction of the disk. Alternatively, as illustrated in FIG. 10, at least a portion (at least a portion located radially inside the vent window 19) of the inner curved portion 15d in the circumferential direction of the disk may protrude inwardly (toward the intermediate inner portion 16) in the radial direction of the disk.

The intermediate inner portion 16 may be a portion connecting the hub coupling portion 12 and the hat portion 15. An entire portion or a substantially entire portion of the intermediate inner portion 16 may be inclined outwardly in the axial direction of the disk in a radial cross section of the disk and smoothly connects the hub coupling portion 12 and the hat portion 15.

In the radial direction of the disk, at least a hub coupling portion-side end and its vicinity of the intermediate inner portion 16 may be constructed by a rising portion 16a rising substantially straight from the hub coupling portion 12 outwardly in the radial direction of the disk and outwardly in the axial direction of the disk. A radial position of the hub coupling portion-side end of the rising portion 16a may be constant (including "substantially constant") or may vary in the circumferential direction of the disk.

(i) In the case where the radial position of the hub coupling portion-side end of the rising portion 16a is constant in the circumferential direction of the disk, the hub coupling portion-side end of the rising portion 16a may be located outer than the hub bolt holes 12a in the radial direction of the disk. The shape of the hub coupling portion-side end of the rising portion 16a when viewed in the axial direction of the disk may be circular of substantially circular. In this case, a shape of a radially outer end of the hub coupling portion 12 may be circular or substantially circular at a portion radially outside the hub bolt holes 12a provided around the hub hole 11 so as to be equally spaced from each other, whereby the wheel can be stably supported by a hub when a moment is loaded on the disk 10 in the radial direction of the disk.

(ii) In the case where the radial position of the hub coupling portion-side end of the rising portion 16a varies in the circumferential direction of the disk, as illustrated in FIGS. 12 and 13, the hub coupling portion-side end of a portion of the rising portion 16a, located at the same circumferential position as the hub bolt hole 12, may be located outer than the hub bolt hole 12a in the radial direction of the disk. The hub coupling portion-side end of a portion of the rising portion 16a, located at the same circumferential position as a disk portion between adjacent hub bolt holes 12a, may be located inner than a disk-radially outer end of the bolt hole 12a in the radial direction of the disk. In this case, a shape of a radially outer end of the hub coupling portion 12 may be wavy (like a flower), and a rigidity of the hub coupling portion 12 may be higher than that of the case of (i) above.

As illustrated in FIG. 2, the intermediate outer portion 17 is a portion located between the hat portion 15 and the disk flange portion 13 in the radial direction of the disk. The intermediate outer portion 17 is a portion connecting the hat portion 15 and the disk flange portion 13 (in the radial direction of the disk).

In the radial cross section of the disk, an entire portion or a substantially entire portion of the intermediate outer portion 17 may be inclined inwardly in the axial direction of the disk in an outwardly radially direction so as to connect the hat portion 15 and the disk flange portion 13. This portion of the intermediate outer portion 17 may extend straight outwardly in the axial direction of the disk, or may extend curved outwardly in the axial direction of the disk.

Alternatively, in the radial cross section of the disk, the intermediate outer portion 17 may extend from hat portion 15 outwardly in the radial direction of the disk (in a direction perpendicular to the axial direction of the disk) to a radial position and then may be extend from the radial position via a curved portion having a relatively large radius to the disk flange portion 13.

As illustrated in FIG. 1, in the case where the first portion 15e of the outer curved portion 15c of the hat portion 15 may be located radially inwardly compared to the circle (line) connecting the radially outermost portions of the plurality of vent windows 19 in the radial direction of the disk, the intermediate outer portion 17 may include a plurality of spoke portions 18. In the embodiments of the present invention described below, the case where the first portion 15e of the outer curved portion 15c of the hat portion 15 is located radially inwardly compared to the circle (line) connecting the radially outermost portions of the plurality of vent windows 19 in the radial direction of the disk and the intermediate outer portion 17 includes the plurality of spoke portions 18 will be explained.

Figure 17:
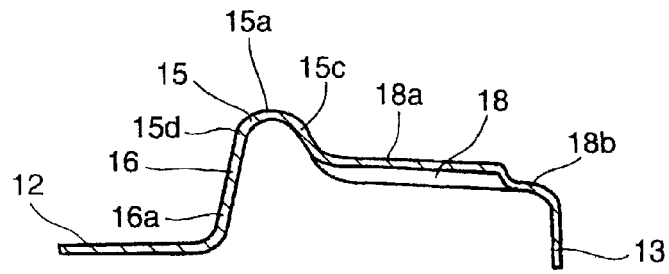
FIG. 17 is a cross-sectional view of a spoke portion and a vicinity thereof, of a vehicle wheel disk according to an embodiment of the present invention, where the spoke portion is connected to a disk flange portion via a spoke shift portion.

The spoke portion 18 may extend outwardly from the outer curved portion 15c of the hat portion 15 in the radial direction of the disk. As illustrated in FIG. 17, the radially outer end of the spoke portion 18 may be connected to the disk flange portion 13 via a spoke shift portion 18b which may be provided between the spoke portion 18 and the disk flange portion 13. Alternatively, the radially outer end of the spoke portion 18 may reach the disk flange portion 13 and may be directly connected to the disk flange portion 13.

Figure 18:
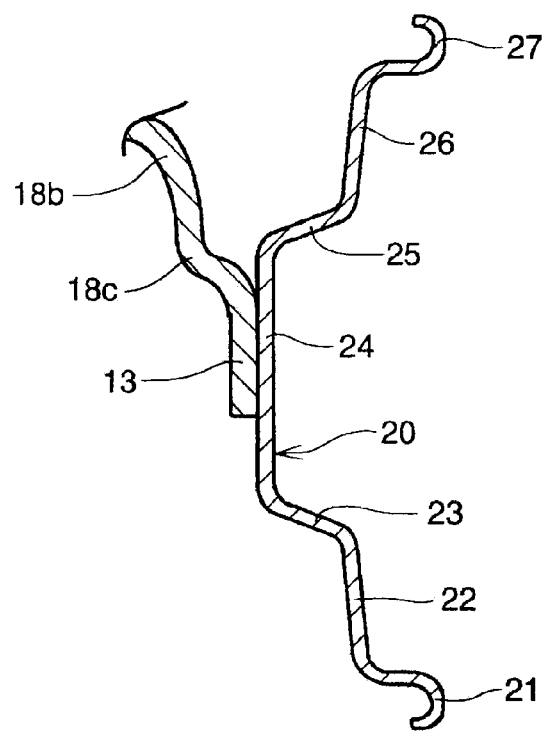
FIG. 18 is a cross-sectional view of a spoke portion and a vicinity thereof, of a vehicle wheel disk according to an embodiment of the present invention, where the spoke portion is connected to a disk flange portion via a spoke shift portion and a step is formed at the spoke shift portion.

In the case where the spoke shift portion 18b is provided, in the radial cross section of the disk, the spoke shift portion 18b may extend straight outwardly in the radial direction of the disk and inwardly in the axial direction of the disk, or may extend, curvedly outwardly and/or inwardly in the axial direction of the disk, in the radial direction of the disk and inwardly in the axial direction of the disk. Alternatively, as illustrated in FIG. 18, the spoke shift portion 18b may be connected to the disk flange portion 13 via a step 18c. The spoke shift portion 18b is a portion of the intermediate outer portion 17.

As illustrated in FIG. 1, a plurality of spoke portions 18 may be provided in the circumferential direction of the disk. For example, five spoke portions 18 may be provided in the circumferential direction of the disk. The number of the spoke portions 18 is not limited to five, and may be three, four, or six or more.

The number of the spoke portions 18 may be equal to or different from the number of the hub bolt holes 12a. The positions of the spoke portions 18 in the circumferential direction of the disk may be equal to or different from the positions of the hub bolt holes 12a in the circumferential direction of the disk.

In a circumferential cross section of the disk at a portion of the disk located radially outer than the hat portion 15 (e.g., in a cross section taken along line B-B in FIG. 1), the spoke portion 18 may extend straight or substantially straight. Alternatively, as illustrated in FIGS. 4 and 16, a spoke convex portion 18a may extend outwardly or inwardly in the axial direction of the disk relative to other portions of the spoke portion 18 may be provided at a central portion in a width direction of the spoke portion 18 or the vicinity thereof in order to increase a rigidity of the spoke portion 18.

As illustrated in FIG. 1, the vent window 19 is provided between adjacent spoke portions 18. The vent windows 19 are equally spaced from each other in the circumferential direction of the disk. The same number of vent windows 19 as that of the spoke portions 18 is provided. An outer portion in the radial direction of the disk, of a periphery of the vent window 19 may reach the disk flange portion 13 and may be directly connected to the disk flange portion 13, or may be connected to the disk flange portion 13 via a shift portion 19a provided between the vent window 19 and the disk flange portion 13 as illustrated in FIG. 2. In the case where the shift portion 19a is provided, in the radial cross section of the disk, the shift portion 19a may extend straight outwardly in the radial direction of the disk and inwardly in the axial direction of the disk, or may extend, curvedly in the outwardly and/or inwardly in the axial direction of the disk, in the radial direction of the disk and inwardly in the axial direction of the disk. Alternatively, the shift portion 19a may have a step connected to the disk flange portion 13 like the spoke shift portion 18b illustrated in FIG. 18. The shift portion 19a is a portion of the intermediate outer portion 17.

In the case where the shift portion 19a is provided and further the spoke shift portion 18b is provided, a cross-sectional shape of the shift portion 19a in the radial cross section of the disk may be equal to or different from a cross-sectional shape of the spoke shift portion 18b in the radial cross section of the disk.

As illustrated in FIG. 1, a concave portion 30 may be provided at the intermediate inner portion 16. When a first circle is defined having a center at a radial center of the disk and extending through a radially outermost point of the first portion 15g of the inner curved portion 15d of the hat portion 15, and a second circle is defined having a center at the radial center of the disk and extending through a radially innermost point of the second portion 15h of the inner curved portion 15h of the hat portion 15, the concave portion 30 may be a portion which is concave relative to the hat portion 15, located at the same circumferential position as the first portion 15g of the inner curved portion 15d of the hat portion 15, in the axial direction of the disk in a cross section taken along a third circle having its center at the radial center of the disk and having a smaller diameter than the first circle and a larger diameter than the second circle (i.e., in a cross section taken along line A-A in FIG. 1).

As illustrated in FIG. 3, the concave portion 30 may have a bottom wall 31 and a side wall 32 rising outwardly from circumferentially opposite ends of the bottom wall 31 in the axial direction of the disk and in a direction away from the bottom wall 31 in the cross section taken along the third circle (i.e., in the cross section taken along line A-A in FIG. 1).

As illustrated in FIG. 2, the bottom wall 31 of the concave portion may be located more outward than the hub coupling portion 12 in the axial direction of the disk. The bottom wall 31 of the concave portion may be smoothly connected to a radially outer and axially outer end portion of the rising portion 16a of the intermediate inner portion 16 and may be inclined outward in the radial direction of the disk and outward in the axial direction of the disk from the radially outer and axially outer end portion of the rising portion 16a of the intermediate inner portion 16. The bottom wall 31 of the concave portion may extend straight or may extend curved, outward in the radial direction of the disk and outward in the axial direction of the disk.

As illustrated in FIG. 3, the side wall 32 of the concave portion may be smoothly connected to the inner curved portion 15d of the hat portion 15.

In the embodiments of the present invention, (a) since the outer curved portion 15c of the hat portion 15 may include the first portion 15e of the outer curved portion and the second portion 15f of the outer curved portion offset from the first portion 15e of the outer curved portion in the circumferential direction of the disk and located inner than the first portion 15e of the outer curved portion in the radial direction of the disk, (b) since the inner curved portion 15d of the hat portion 15 may include the first portion 15g of the inner curved portion and the second portion 15h of the inner curved portion offset from the first portion 15g of the inner curved portion in the circumferential direction of the disk and located inner than the first portion 15g of the inner curved portion in the radial direction of the disk, and (c) since the first portion 15g of the inner curved portion 15d may be located radially inside the first portion 15e of the outer curved portion 15c, and the second portion 15h of the inner curved portion 15d may be located radially inside the second portion 15f of the outer curved portion 15c, the crest portion 15a continuous in the circumferential direction of the disk and the hat portion 15 having the inner curved portion 15d are wavy (like a shape of a serpentine or a flower) when viewed in the axial direction of the disk. The first portion 15e of the outer curved portion and the first portion 15g of the inner curved portion may protrude into the spoke portion 18.

As a result, compared with the (conventional) case where the hat portion continuous in the circumferential direction of the disk is located on a circle having a constant diameter or the (conventional) case where the protruding portion corresponding to the hat portion disappears at the radially outer portion of the disk and is discontinuous in the circumferential direction of the disk, a bending rigidity and a bending strength in all directions, of the disk 10, especially of the portion of the disk located between the vent windows 19 in the circumferential direction of the disk, are increased. As a result, even when the vent window 19 is enlarged in order to improve a design characteristic without increasing the thickness of the material of the disk 10, the strength (fatigue strength) and the rigidity of the disk 10 can be secured or ensured.

Further, since it is unnecessary to increase the thickness of the disk material, the disk can be lightened compared with a case where the thickness of the disk material is increased in order to secure or ensure the strength and the rigidity of the disk and to enlarge the vent window.

Since at least the first portion 15e of the outer curved portion 15c of the hat portion 15 may be located radially outer than the circle passing radially inner ends of vent windows 19, even if the vent window 19 is enlarged compared with the conventional case, the bending strength and the bending rigidity in all directions, of the disk portion located between adjacent vent windows 19 in the circumferential direction of the disk can be increased. Further, excessively large stress concentration to a surrounding portion of the vent window 19 can be improved.

Since the first portion 15e of the outer curved portion 15c of the hat portion 15 may be located radially inner than an enveloping circle passing radially outer ends of vent windows 19, the spoke portion 18 (and the spoke shift portion 18b) connecting the hat portion 15 and the disk flange portion 13 can be provided. As a result, an excessively large stress concentration can be prevented from being caused at the connecting portion between the hat portion 15 and the disk flange portion 13, unlike the case where the spoke portion 18 (including the spoke shift portion 18b) is not provided and the hat portion 15 is directly connected to the disk flange portion 13.

Since the concave portion 30, which is concave relative to the hat portion 15 in the axial direction of the disk in a cross section taken along a third circle having its circle center at the radial center of the disk, may be provided, a bending rigidity of the hat portion 15 in the radial direction of the disk can be increased compared with the case where the concave portion 30 is not provided.

Since the bottom wall 31 of the concave portion may be located more outward than the hub coupling portion 12 in the axial direction of the disk and is inclined outward in the radial direction of the disk and outward in the axial direction of the disk, the hub coupling portion 12 and the inner curved portion 15d of the hat portion 15 can be smoothly connected to each other, whereby formability is improved.

Since the crest portion 15a of the hat portion 15 may have a larger radial width at a portion located radially inside the vent window 19 in the circumferential direction of the disk (i.e., a width in the radial direction of the disk between the second portion 15f of the outer curved portion and the second portion 15h of the inner curved portion) than a radial width at a portion located between adjacent vent windows 19 in the circumferential direction of the disk (i.e., a width between the first portion 15e of the outer curved portion and the first portion 15g of the inner curved portion), a disk design where the crest portion 15a of the hat portion 15 has a radial width non-constant along the circumferential direction of the disk can be adopted, and the rigidity of the disk can be increased.

In the case where the spoke convex portion 18a may be provided at the spoke portion 18, a rigidity of the spoke portion 18 can be increased, compared with the spoke convex portion 18a is not provided.

In the case where, as illustrated in FIG. 11, the entire portion of the second portion 15h of the inner curved portion 15d may be concave inwardly in the radial direction of the disk like the shape of the radially inner portion of the vent window 19, the following effect can be obtained:

Since the entire portion of the second portion 15f of the outer curved portion 15c may be concave inwardly in the radial direction of the disk like the shape of the radially inner portion of the vent window 19, a distance in the radial direction of the disk between the second portion 15f of the outer curved portion 15c and the second portion 15h of the inner curved portion 15d is easily secure. As a result, the vent window 19 can be enlarged without decreasing the rigidity of the disk 10, and in addition, formability can be improved.

In the case where, as illustrated in FIG. 9, a part of the circumferentially central portion and the vicinity thereof of the second portion 15h of the inner curved portion may be convex outwardly in the radial direction of the disk at a larger curvature (at a smaller radius of curvature) than a curvature of the arc (in the embodiment of FIG. 1) having its center at the radial center of the disk, the following effect can be obtained:

Even if the disk position where the spoke portion 18 is provided and the disk position where the hub bolt hole 12*a* may be different from each other in the circumferential direction of the disk (e.g., alternate to each other) from restriction of design, a space for providing the hub hole 12*a* can be easily secured and without decreasing the rigidity of the disk 10.

In the case where, as illustrated in FIG. 10, at least a portion in the circumferential direction of the disk, of the inner curved portion 15*d* of the hat portion 10 protrudes inwardly in the radial direction of the disk, the following effect can be obtained:

The rigidity of the disk 10 can be further increased compared with a case where an entire portion in the circumferential direction of the disk, of the inner curved portion 15*d* of the hat portion 15 does not protrude inwardly in the radial direction of the disk. Further, the vent window 19 can be enlarged inwardly in the radial direction of the disk.

Next, portions unique to respective embodiments of the present invention will be explained.

First Embodiment

FIGS. 1-4

In the first embodiment, the disk may be constructed as follows:
(a) The number of the spokes 18 and the number of the hub bolt holes 12*a* may be equal to each other (e.g., both, five).
(b) The position of the spoke 18 in the circumferential direction of the disk and the position of the hub bolt hole 12*a* in the circumferential direction of the disk may be equal to each other.
(c) The spoke convex portion 18*a* may be convex outwardly in the axial direction of the disk.
(d) The circumferentially central portion and its vicinity, of the second portion 15*h* of the inner curved portion 15*d* of the hat portion 15 may be in the form of an arc having its arc center at the radial center of the disk.
(e) The shape of the radially outer end of the hub coupling portion 12 may be circular or substantially circular.
(f) The outer curved portion 15*c* of the hat portion 15 may be continuous in the circumferential direction of the disk over the entire circumference.

In the first embodiment of the present invention, the following effect can be obtained:

Since the outer curved portion 15*c* may be continuous in the circumferential direction of the disk over the entire circumference, compared with a case where a discontinuous portion discontinuous in the circumferential direction of the disk is provided to the outer curved portion 15*c*, the bending rigidity and the bending strength of the disk in the radial direction of the disk can be increased against loads in all directions which the disk receives via the disk flange portion 13, when the hub coupling portion 12 is fixed to a hub of a vehicle and the vehicle runs.

This effect is applicable to not only the first embodiment of the present invention but also the second to seventh embodiments of the present invention.

Second Embodiment

FIG. 5

In the second embodiment, the disk may be constructed as follows:
(a) The number of the spoke portions 18 and the number of the hub bolt holes 12*a* may be equal to each other (e.g., both, five).
(b) The position of the spoke 18 in the circumferential direction of the disk and the position of the hub bolt hole 12*a* in the circumferential direction of the disk may be different from each other.
(c) The spoke convex portion 18*a* may be convex outwardly in the axial direction of the disk.
(d) The circumferentially central portion and its vicinity, of the second portion 15*h* of the inner curved portion 15*d* of the hat portion 15 may be in the form of an arc having its arc center at the radial center of the disk.
(e) The shape of the radially outer end of the hub coupling portion 12 may be circular or substantially circular.
(f) The outer curved portion 15*c* of the hat portion 15 may be continuous in the circumferential direction of the disk over the entire circumference.

Third Embodiment

FIGS. 6-8

In the third embodiment, the disk may be constructed as follows:
(a) The number of the spoke portions 18 may be different from the number of the hub bolt holes 12*a*.
(b) The spoke convex portion 18*a* may not be provided to the spoke portion 18.
(c) The circumferentially central portion and its vicinity, of the second portion 15*h* of the inner curved portion 15*d* of the hat portion 15 may be in the form of an arc having its arc center at the radial center of the disk.
(d) The shape of the radially outer end of the hub coupling portion 12 is circular or substantially circular.
(e) The outer curved portion 15*c* of the hat portion 15 is continuous in the circumferential direction of the disk over the entire circumference.

Fourth Embodiment

FIG. 9

In the fourth embodiment, the disk may be constructed as follows:
(a) The number of the spoke portions 18 and the number of the hub bolt holes 12*a* may be equal to each other (e.g., both, five).
(b) The position of the spoke 18 in the circumferential direction of the disk and the position of the hub bolt hole 12*a* in the circumferential direction of the disk may be different from each other.
(c) The spoke convex portion 18*a* may be convex outwardly in the axial direction of the disk.
(d) A part of the circumferentially central portion and its vicinity, of the second portion 15*h* of the inner curved portion 15*d* of the hat portion 15 may be convex outwardly in the radial direction of the disk at a larger curvature than an arc (of the embodiment of FIG. 1) having its arc center at the radial center of the disk.
(e) The shape of the radially outer end of the hub coupling portion 12 may be circular or substantially circular.
(f) The outer curved portion 15*c* of the hat portion 15 may be continuous in the circumferential direction of the disk over the entire circumference.

Fifth Embodiment

FIG. 10

In the fifth embodiment, the disk may be constructed as follows:
(a) The portion of the inner curved portion 15*d* of the hat portion 15 located radially inwardly from the vent window 19 (i.e., the second portion 15*h* of the inner curved portion 15*d*) may protrude inwardly in the radial direction of the disk.
(b) The outer curved portion 15*c* of the hat portion 15 may be continuous in the circumferential direction of the disk over the entire circumference.

Sixth Embodiment

FIG. 11

In the sixth embodiment, the disk may be constructed as follows:
(a) The number of the spoke portions 18 and the number of the hub bolt holes 12*a* may be equal to each other (e.g., both, five).
(b) The position of the spoke 18 in the circumferential direction of the disk and the position of the hub bolt hole 12*a* in the circumferential direction of the disk may be equal to each other.
(c) The spoke convex portion 18*a* may be convex outwardly in the axial direction of the disk.
(d) The entirety of the second portion 15*h* of the inner curved portion 15*d* of the hat portion 15 may be concave inwardly in the radial direction of the disk like the shape of the radially inner portion of the vent window 19.
(e) The portion of the inner curved portion 15*d* of the hat portion 15 located radially inwardly from the vent window 19 (i.e., the second portion 15*h* of the inner curved portion) may protrude inwardly in the radial direction of the disk.
(f) The shape of the radially outer end of the hub coupling portion 12 may be circular or substantially circular.
(g) The outer curved portion 15*c* of the hat portion 15 may be continuous in the circumferential direction of the disk over the entire circumference.

Seventh Embodiment

FIGS. 12 and 13

In the seventh embodiment, the disk may be constructed as follows:
(a) The number of the spoke portions 18 and the number of the hub bolt holes 12*a* may be equal to each other (e.g., both, five).
(b) The position of the spoke 18 in the circumferential direction of the disk and the position of the hub bolt hole 12*a* in the circumferential direction of the disk may be equal to each other.
(c) The spoke convex portion 18*a* may be provided in the spoke portion 18.
(d) The shape of the radially outer end of the hub coupling portion 12 may be a shape of a wave (i.e., a flower).
(e) The outer curved portion 15*c* of the hat portion 15 may be continuous in the circumferential direction of the disk over the entire circumference.

Eighth Embodiment

FIGS. 14-16

In the eighth embodiment, the disk may be constructed as follows:
(a) The number of the spoke portions 18 and the number of the hub bolt holes 12*a* may be equal to each other (e.g., both, four).
(b) The position of the spoke 18 in the circumferential direction of the disk and the position of the hub bolt hole 12*a* in the circumferential direction of the disk may be equal to each other.
(c) The spoke convex portion 18*a* may be provided to the spoke portion 18.
(d) The second portion 15*h* of the inner curved portion 15*d* of the hat portion 15 may be formed in the shape of alphabet letter "V" (including a substantial "V") where the circumferentially central portion is located inner in the radial direction of the disk than the circumferentially opposite ends.
(e) The shape of the radially outer end of the hub coupling portion 12 may be a shape of a wave (i.e., a flower).
(f) The outer curved portion 15*c* of the hat portion 15 is continuous in the circumferential direction of the first portion 15*e* of the outer curved portion and has the discontinuous portion 15*f1* discontinuous in the circumferential direction of the disk at the circumferentially central portion of the second portion 15*f* of the outer curved portion.

The eighth embodiment of the present invention has the following unique effect:

Since the outer curved portion 15*c* has the discontinuous portion 15*f1* discontinuous in the circumferential direction of the disk at the second portion 15*f* of the outer curved portion, a length in the radial direction, of the vent window 19 is made large compared with the case where the outer curved portion 15*c* is continuous in the circumferential direction of the disk over the entire circumference, and the design characteristic can be improved.

The invention claimed is:
1. A vehicle wheel disk comprising a hub coupling portion, a disk flange portion, and an intermediate portion connecting the hub coupling portion and the disk flange portion,
the intermediate portion including a hat portion protruding outwardly in an axial direction of the disk, an intermediate inner portion connecting the hat portion and the hub coupling portion, and an intermediate outer portion connecting the hat portion and the disk flange portion,
the intermediate outer portion having a vent window formed therein,
wherein the hat portion includes a crest portion extending continuously in a circumferential direction of the disk, an inner curved portion curved inwardly in the axial direction of the disk radially inside the crest portion and extending continuously in the circumferential direction of the disk, and an outer curved portion curved inwardly in the axial direction of the disk radially outside the crest portion and extending in the circumferential direction of the disk,
wherein the outer curved portion includes a first portion and a second portion offset from the first portion of the outer curved portion in the circumferential direction of the disk and located inner than the first portion of the outer curved portion in a radial direction of the disk,
wherein the first portion of the outer curved portion is located between adjacent vent windows, and the second portion of the outer curved portion is located inside the vent window in the radial direction of the disk,
wherein the inner curved portion includes a first portion and a second portion offset from the first portion of the inner curved portion in the circumferential direction of the disk and located inner than the first portion of the inner curved portion in the radial direction of the disk, wherein the first portion of the inner curved portion is located radially inside the first portion of the outer curved portion, and the second portion of the inner curved portion is located radially inside the second portion of the outer curved portion, and wherein the crest portion is wavy when viewed in the axial direction of the disk.

2. A vehicle wheel disk according to claim 1, wherein at least a portion of the first portion of the outer curved portion is located radially outwardly from a circle extending through radially inner portions of vent windows.

3. A vehicle wheel disk according to claim 1, wherein the first portion of the outer curved portion is located radially inwardly from a circle passing through radially outer portions of vent windows.

4. A vehicle wheel disk according to claim 1, wherein when a first circle is defined having a center at a radial center of the disk and passing through a radially outermost point of the first portion of the inner curved portion, and a second circle is defined having a center at the radial center of the disk and passing through a radially innermost point of the second portion of the inner curved portion, a concave portion is provided which is concave relative to the hat portion in the axial direction of the disk in a cross section taken along a third circle having a center at the radial center of the disk and having a smaller diameter than the first circle and a larger diameter than the second circle.

5. A vehicle wheel disk according to claim 4, wherein the concave portion includes a bottom wall and a side wall rising outwardly in the axial direction of the disk from the bottom wall in the cross section taken along the third circle.

6. A vehicle wheel disk according to claim 5, wherein the bottom wall of the concave portion is located more outward than the hub coupling portion in the axial direction of the disk and is inclined outward in the radial direction of the disk and outward in the axial direction of the disk.

7. A vehicle wheel disk according to claim 1, wherein the crest portion has a larger radial width between the second portion of the outer curved portion and the second portion of the inner curved portion than between the first portion of the outer curved portion and the first portion of the inner curved portion.

8. A vehicle wheel disk according to claim 1, wherein the outer curved portion is continuous over an entire circumference of the disk in the circumferential direction of the wheel.

9. A vehicle wheel disk according to claim 1, wherein the outer curved portion is continuous in the circumferential direction of the wheel at the first portion of the outer curved portion, and has a discontinuous portion discontinuous in the circumferential direction of the wheel at the second portion of the outer curved portion.

10. A vehicle wheel disk comprising a hub coupling portion, a disk flange portion, and an intermediate portion connecting the hub coupling portion and the disk flange portion, the intermediate portion including a hat portion protruding outwardly in an axial direction of the disk, an intermediate inner portion connecting the hat portion and the hub coupling portion, and an intermediate outer portion connecting the hat portion and the disk flange portion, the intermediate outer portion having a vent window formed therein, wherein the hat portion includes a crest portion extending continuously in a circumferential direction of the disk, an inner curved portion curved inwardly in the axial direction of the disk radially inside the crest portion and extending continuously in the circumferential direction of the disk, and an outer curved portion curved inwardly in the axial direction of the disk radially outside the crest portion and extending in the circumferential direction of the disk, wherein the outer curved portion includes a first portion and a second portion offset from the first portion of the outer curved portion in the circumferential direction of the disk and located inner than the first portion of the outer curved portion in a radial direction of the disk, wherein the first portion of the outer curved portion is located between adjacent vent windows, and the second portion of the outer curved portion is located inside the vent window in the radial direction of the disk, wherein the inner curved portion includes a first portion and a second portion offset from the first portion of the inner curved portion in the circumferential direction of the disk and located inner than the first portion of the inner curved portion in the radial direction of the disk, wherein the first portion of the inner curved portion is located radially inside the first portion of the outer curved portion, and the second portion of the inner curved portion is located radially inside the second portion of the outer curved portion, and wherein a radial width of the crest portion at a portion radially inside the vent window in the circumferential direction of the disk and a radial width of the crest portion at a portion between adjacent vent windows in the circumferential direction of the disk are different from each other.

11. A vehicle wheel disk according to claim 10, wherein at least a portion of the first portion of the outer curved portion is located radially outwardly from a circle extending through radially inner portions of vent windows.

12. A vehicle wheel disk according to claim 10, wherein the first portion of the outer curved portion is located radially inwardly from a circle passing through radially outer portions of vent windows.

13. A vehicle wheel disk according to claim 10, wherein when a first circle is defined having a center at a radial center of the disk and passing through a radially outermost point of the first portion of the inner curved portion, and a second circle is defined having a center at the radial center of the disk and passing through a radially innermost point of the second portion of the inner curved portion, a concave portion is provided which is concave relative to the hat portion in the axial direction of the disk in a cross section taken along a third circle having a center at the radial center of the disk and having a smaller diameter than the first circle and a larger diameter than the second circle.

14. A vehicle wheel disk according to claim 13, wherein the concave portion includes a bottom wall and a side wall rising outwardly in the axial direction of the disk from the bottom wall in the cross section taken along the third circle.

15. A vehicle wheel disk according to claim 14, wherein the bottom wall of the concave portion is located more outward than the hub coupling portion in the axial direction of the disk and is inclined outward in the radial direction of the disk and outward in the axial direction of the disk.

16. A vehicle wheel disk according to claim 10, wherein the crest portion has a larger radial width between the second portion of the outer curved portion and the second portion of the inner curved portion than between the first portion of the outer curved portion and the first portion of the inner curved portion.

17. A vehicle wheel disk according to claim 10, wherein the outer curved portion is continuous over an entire circumference of the disk in the circumferential direction of the wheel.

18. A vehicle wheel disk according to claim 10, wherein the outer curved portion is continuous in the circumferential direction of the wheel at the first portion of the outer curved portion, and has a discontinuous portion discontinuous in the circumferential direction of the wheel at the second portion of the outer curved portion.

\* \* \* \* \*